(12) United States Patent
Shahar et al.

(10) Patent No.: US 10,607,069 B2
(45) Date of Patent: Mar. 31, 2020

(54) DETERMINING A POINTING VECTOR FOR GESTURES PERFORMED BEFORE A DEPTH CAMERA

(71) Applicant: INTEL CORPORATION, Santa Clara, CA (US)

(72) Inventors: Amit Shahar, Sunnyvale, CA (US); Robert L. Davies, Fremont, CA (US); Chia-Hsun Lee, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/262,608

(22) Filed: Sep. 12, 2016

(65) Prior Publication Data

US 2018/0075294 A1    Mar. 15, 2018

(51) Int. Cl.
*G06F 3/01* (2006.01)
*G06K 9/00* (2006.01)
(Continued)

(52) U.S. Cl.
CPC ......... *G06K 9/00355* (2013.01); *G06F 3/017* (2013.01); *G06K 9/00* (2013.01); *G06K 9/00375* (2013.01); *G06K 9/44* (2013.01); *G06K 9/52* (2013.01); *G06T 7/11* (2017.01); *G06T 7/155* (2017.01); *G06T 7/74* (2017.01);
(Continued)

(58) Field of Classification Search
CPC .... G06F 3/04883; G06F 3/017; G06F 3/0488; G06F 3/0482; G06F 3/04842; G06K 9/00375; G06K 2009/3225; G06K 9/00355; G06K 9/0061; G06T 2207/10028; G06T 2207/20036
See application file for complete search history.

(56) References Cited

U.S. PATENT DOCUMENTS

| 8,686,943 B1 * | 4/2014 | Rafii | G06F 3/017 345/158 |
| 8,933,912 B2 * | 1/2015 | Ambrus | G02B 27/0093 178/18.09 |

(Continued)

OTHER PUBLICATIONS

Konwar et al., An American Sign Language detection system using HSV color model and edge detection, Apr. 3-5, 2014 [retrieved Jun. 19, 2019], 2014 Inter Conf Comm & Signal Proc, pp. 743-747. Retrieved: https://ieeexplore.ieee.org/abstract/document/6949942 (Year: 2014).*

(Continued)

*Primary Examiner* — Andrew M Moyer
*Assistant Examiner* — Dennis Rosario
(74) *Attorney, Agent, or Firm* — International IP Law Group, P.L.L.C.

(57) ABSTRACT

A pointing vector is determined for a gesture that is performed before a depth camera. One example includes receiving a first and a second image of a pointing gesture in a depth camera, the depth camera having a first and a second image sensor, applying erosion and dilation to the first image using a 2D convolution filter to isolate the gesture from other objects, finding the imaged gesture in the filtered first image of the camera, finding a pointing tip of the imaged gesture, determining a position of the pointing tip of the imaged gesture using the second image, and determining a pointing vector using the determined position of the pointing tip.

15 Claims, 8 Drawing Sheets

(51) Int. Cl.
*H04N 13/254* (2018.01)
*H04N 13/239* (2018.01)
*G06K 9/52* (2006.01)
*G06T 7/11* (2017.01)
*G06K 9/44* (2006.01)
*G06T 7/73* (2017.01)
*G06T 7/155* (2017.01)
*H04N 13/271* (2018.01)
*H04N 13/00* (2018.01)

(52) U.S. Cl.
CPC ......... *H04N 13/239* (2018.05); *H04N 13/254* (2018.05); *H04N 13/271* (2018.05); *G06T 2207/10028* (2013.01); *H04N 2013/0081* (2013.01)

(56) References Cited

U.S. PATENT DOCUMENTS

| | | | |
|---|---|---|---|
| 9,092,665 B2* | 7/2015 | Stoppa | G06K 9/00355 |
| 9,224,060 B1* | 12/2015 | Ramaswamy | G06K 9/00912 |
| 9,436,872 B2* | 9/2016 | Tang | G06K 9/00389 |
| 9,519,972 B2* | 12/2016 | Venkataraman | G06T 7/557 |
| 2013/0159940 A1* | 6/2013 | Duffy | G06F 3/017 |
| | | | 715/863 |

OTHER PUBLICATIONS

Hiraiwa et al., An FPGA Implementation of Reconfigurable Real-Time Vision Architecture, Mar. 25-28, 2013 [retrieved Jun. 19, 2019], 2013 27th Inter Conf Adv Info Net Apps Workshop, pp. 150-155. Retrieved: https://ieeexplore.ieee.org/abstract/document/6550388 (Year: 2013).*

* cited by examiner

DETERMINING A POINTING VECTOR FOR GESTURES PERFORMED BEFORE A DEPTH CAMERA

FIELD

The present description is related to identifying objects using a camera and, in particular, to determining a pointing vector from a hand or other gesture.

BACKGROUND

The man-machine interface is a primary limitation in integrating machine capabilities for communication, recording, power, and assistance into everyday life. With new and old machine form factors, new user interface systems are made possible. The advent of high definition, small low cost cameras has made it possible to use cameras as part of how a user communicates with a machine. While users are able to learn special behaviors and gestures to communicate to a machine through a camera, the interface feels more natural when a user is able to communicate with the machine as if the other machine is another person.

Many computer input and control systems are being developed which respond to hand motions and gestures. Rather than typing, pressing buttons, or operating a cursor control device, the user makes hand motions in front of a camera. Simpler systems respond only to hand waves and arm motions. For more detailed control, the movements of individual fingers are tracked.

In some systems, a depth-based hand tracking system is used. Different camera systems obtain the depth information in different ways. One such camera system uses two or more cameras physically spaced apart and compares simultaneous images to determine a distance from the cameras to the hand. Other camera systems use a rangefinder or proximity sensor either for particular points in the image or for the whole image such as a time-of-flight camera. A camera system with multiple sensors determines, not only the appearance of the hand, but also the distance to different points on the hand.

One important way in which people communicate visually is through pointing. Hand gestures allow a user to behave in a way that feels natural. However, it is not always easy for the machine to see and observe the hand gestures through a camera. With a head mounted display (HMD), hand gestures are even more useful and are already used in some systems to communicate user intent into the virtual world presented by the HMD. One such hand gesture is pointing. Other gestures include waving, and directing a palm towards or away from the camera.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In order to understand a pointing hand gesture, the camera and underlying processing system find the tip of the pointing finger on the pointing hand and then determine the relationship of the fingertip to the rest of the hand. The direction of pointing can be indicated as a vector where the user is pointing in the relevant space. For a virtual reality system, the vector may be in the virtual space. As described herein, a 3D camera may be used to determine a 3D direction vector from gestures performed in front of a camera. The direction vector may then be used to determine a virtual object that the user is attempting to touch or move or any of a variety of other commands and machine inputs. The described techniques may be applied to a multi-purpose 3D camera and can provide added functionality, such as collision avoidance. Using a mid-range multi-purpose 3D camera, precise pointing vector determinations may be made consistently for fingers that range in distance from a few centimeters up to 4 meters from the camera.

When using a head mounted display (HMD), hand gestures are a useful way to communicate user intent into a virtual world. Pointing is a particularly natural way for the user to interact with the world. In many circumstances, the depth, as reported by the camera, may be used to augment a 2D image of a hand captured by the camera. However, the accuracy of a depth determination is limited by the distance between the depth camera and the hand. If the hand is too close or too far, then the depth determination will not be accurate enough to be useful.

In the described examples, a minimum Z distance (minZ) from the hand to the camera is defined. If the hand is farther than minZ, then the depth is deemed to be reliable. On the other hand, if the hand is closer than minZ, then a different approach is used. First, the saturated portion of the infrared image is used to find the outline of the hand. The fingertip is located using distance from the hand mask centroid. The fingertip position and the camera's location are combined to provide the direction of the vector corresponding to the direction in which the finger is pointing.

Figure 1:
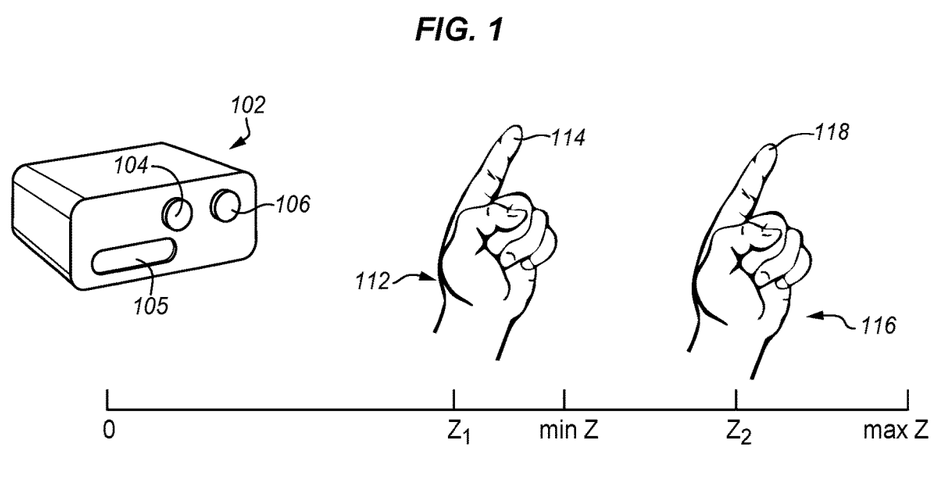
FIG. 1 is a diagram of an imaging system with a view of a gesture image according to an embodiment.

FIG. 1 is a diagram of a stereo camera 102 with a pair of cameras 104, 106 to detect a same object with disparity between the images to determine depth. The stereo camera also has an illuminator 105 to allow the cameras to better capture images. The illuminator may project visible white light or infrared light or both, depending on the functions of the cameras. While a stereo camera is shown, there may be more cameras or depth may be determined using different sensors. The stereo camera has a view of a first hand 112 and a second hand 116. Each hand has a pointing finger 114, 118 that is pointing in a particular direction with respect to the position of the depth camera 102. The first hand is a distance Z1 from the camera and the second hand is a distance Z2 from the camera. The distance minZ is between Z1 and Z2. In other words Z1 is less than minZ and Z2 is greater than minZ.

The depth camera system 102, regardless of the system used to measure depth has a physical limit to the distances at which depth can accurately be determined. If the hand is too close or too far, then the system will not be able to accurately measure depth and so either there will be no depth or the depth data will be wrong. In this example, the near limit of distance is minZ. For the first hand 112, there will be no depth data and for the second hand 116, the depth data should be reliable. The maximum distance (maxZ) is not addressed directly herein, but a similar approach may be used when the depth data is missing regardless of the reason that the depth data is missing.

The maximum distance maxZ, past the second hand, is a distance beyond which the depth data is not accurate. This distance is not discussed in this example. For an HMD the user is limited by the length of his arm so that a hand cannot be much farther than 1 m away for any user. In this case, maxZ is a distance that beyond the reach of the user. For a system in which the user is not wearing the camera, such as a notebook, desktop monitor a user is unlikely to perform gestures at a distance of over 2 m. Even for a living room game or entertainment system or an office conference system, there is a natural distance from the system to the user that is determined by normal behavior and typical room size. For these systems, the user is unlikely to be more than 3 m to 4 m from the camera. Accordingly, the maximum depth range of a stereo camera system is unlikely to limit the usefulness of the system.

For many portable devices and especially for wearable devices, the user is likely to perform gestures for the device when the user's hands are too far close to the device and particularly, too close to the camera. As a result, there will be no depth data for the gesture and it is difficult to determine the pointing vector. For a head mounted system, commonly used for augmented reality and virtual reality, it is natural for the user to bend the elbows in order to perform gestures in front of the head mounted system. This also brings the hands very close to the head and the hands may often be closer than minZ for the particular device.

Figure 2:
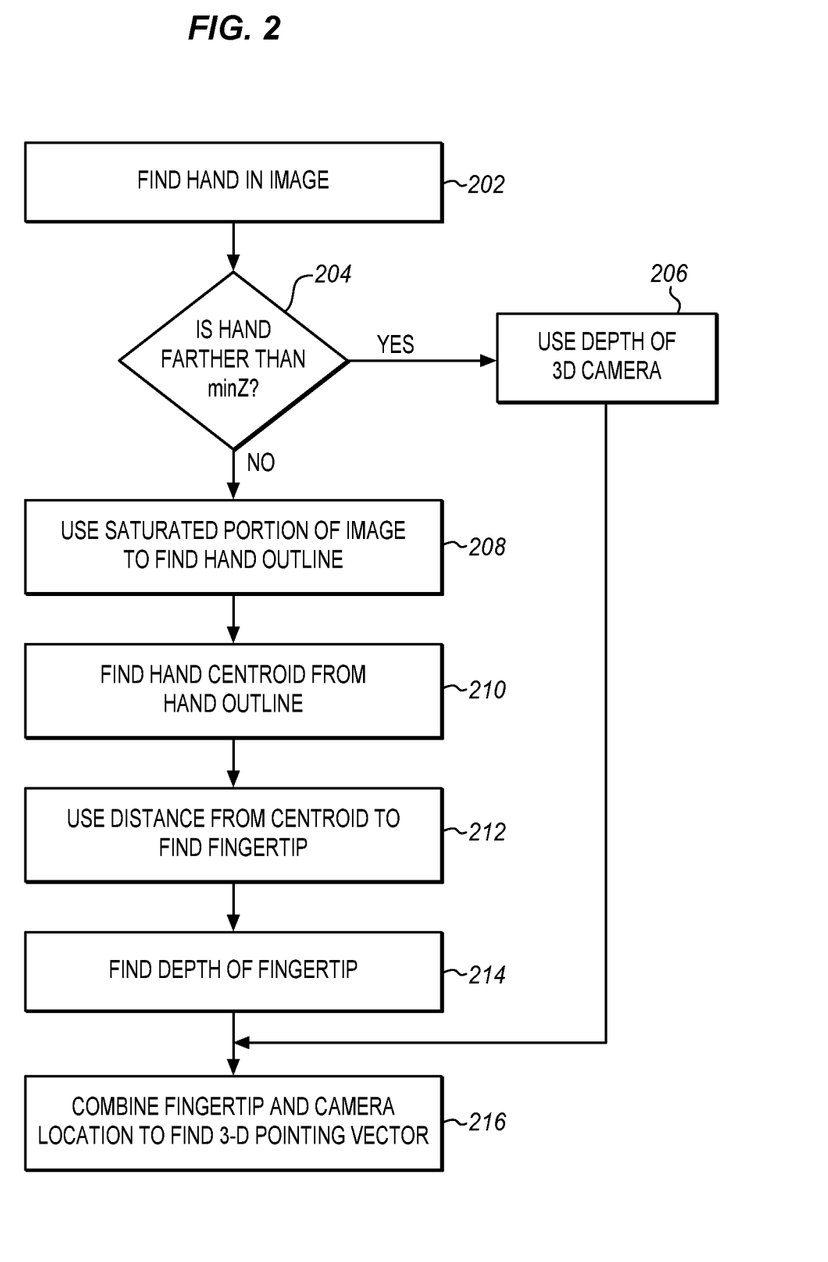
FIG. 2 is a process flow diagram for determining a pointing vector for a gesture according to an embodiment.

FIG. 2 is a process flow diagram for determining a fingertip position and a pointing vector at a wide range of distances on either side of minZ. First at 202 the hand is found in the left or right image or another image, depending on the structure of the 3D or depth camera. As described herein, the threshold of minZ, or in other words the test 204 of having or not having depth data is used to determine how to find a pointing vector. If the hand is farther than the minimum Z distance (minZ) of the camera, then the available depth information as reported by the standard 3D camera is used at 206. The distance from the camera to the fingertip and the 2D location of the fingertip is compared to the distance and location of the palm, heel, centroid, or other location on the hand. These two positions then determine the direction in which the fingertip is pointing at 216.

If the hand is closer than minZ at 204, then no depth data is available. If depth data is available, then it is not reliable. In this case, the saturated portion of the infrared image that includes the hand may be used to find the outline of the hand at 208. Because the hand is too close, the image of the illuminated hand will be saturated, i.e. over illuminated. The outline of the hand will be clear but the detailed features of the hand will be washed out by the illumination. After finding the hand, a hand mask centroid can be determined at 210. A matching or similar hand mask is applied over the outline of the hand to determine generally the position of the palm, heel, fingers, etc. The hand mask will identify the centroid of the hand mask. Alternatively, another definition of a central location of the hand mask may be used.

After finding the centroid, the pointing fingertip is at the farthest point from the centroid at 212. By definition, when a user is pointing the end of the pointing finger will be the point of the hand farthest from the middle of the palm because the pointing finger is stretched out in the direction of pointing. The fingertip or any point that is farthest from the centroid or center of the hand may be selected as the pointing fingertip. Knowing the fingertip position and the hand centroid position in 2D, the depth features of the camera may be used to find a depth or distance from the camera at 214. The depth and the position of the fingertip may be combined with the known location of the camera to determine the 3D pointing vector at 216.

In the described examples, a hand may be distinguished from other objects using the translucent property of human skin. With an illuminator 105, whether visible or infrared, the skin of a user will show a translucency and diffuse the illumination that is projected onto it. A 2D filter applied to an image that includes the hand (this may be a left or right camera image) may be used to produce a mask which isolates skin in the image. Such a 2D filter may be used for medium distances, e.g. up to about a meter away, and also for very short distances, e.g. a few centimeters. The 2D filter for skin produces a useful isolation of the hand when outside of the minZ range but smoothly transitions to saturated light when closer than the minZ range. This saturation keeps the hand mask intact as the hand moves from outside of minZ to inside of minZ.

A 3D IR emitter pattern may be used, for example to separate skin from other non-biological material to create a mask. After erosion and dilation, the mask will show skin as clearly different from other objects. The hand may also be isolated using other techniques, such as shape recognition, edge detection, and skeleton pattern matching, among others. As mentioned above, after the hand is isolated, then the depth data may be used to determine the pointing vector. If the isolated hand is too close to the 3D camera for a depth calculation inside the camera, the depth can still be calculated in the host.

When the hand is too close to the camera so that there is no depth data or so that the depth data is not accurate, only a single point, the fingertip, is required to determine a pointing vector. The depth of the fingertip may still be determined using the disparity between the fingertip location in the left and right images.

Once the hand mask is isolated, the fingertip location may be determined. In some embodiments, this may be done by first finding the centroid of the hand mask, then finding a point farthest from the centroid, then finding a second point farthest from the first point. This approach will identify two points, the wrist and the fingertip. The first or the second farthest point may be either the fingertip or the wrist but the point farthest from the edge of the image may be identified as the fingertip.

The skin detection, hand mask, and distance determinations are able to find and identify the fingertip regardless of whether the fingertip is in the normal operating range of the camera or not. If the region surrounding the fingertip has depth, that depth may be used to determine the distance to the fingertip. If the region surrounding the fingertip has no depth, then disparity between the left and right images may be used to find that distance. The distance is inversely related to the disparity.

After the fingertip in one of the images has been identified with the hand mask in the region of the fingertip, this information may be used to aid in finding the fingertip in the other image. If the cameras are calibrated then the vertical or y coordinates for the fingertip in the one image is identical to or equivalent to the y-coordinates of the fingertip in the other image. A search can be performed to find the x-coordinates for the fingertip in the other image. The search may be made faster by starting at an x-coordinate that is identical to or equivalent to the x-coordinate of the first image in which the fingertip is already identified. A one-way search may then be conducted in the direction of disparity until the fingertip is found at the amount of disparity corresponding to the distance of the fingertip.

Because a disparity calculation is only needed when the fingertip is closer than minZ, the hand mask for the second image may be created by finding saturated image pixels. This produces a hand mask that corresponds to the hand mask identified in the first image, the image in which the hand was first identified. The centroid of both images may be computed from the two masks and the disparity is the difference in the x-coordinates. The distance may then be computed as a constant divided by the disparity where the constant is dependent on the distance between the left and right imagers. This distance and the pixel dimensions are all fixed based on the characteristics of the image sensor and physical structure of the depth camera. They may vary depending on whether the cameras are stereo IR cameras, or another depth camera structure.

Using this approach a 3D or depth camera is able to determine a distance for a single point or set of points at distances closer than the minZ for the 3D camera. This allows for a more convenient, accurate and convenient hand gesture system. The capability of a 3D camera on a Head-Mounted Display (HMD) is enhanced with the described structure and technique. The minimum distance for some depth cameras would require that a user gesture with the arm completely outstretched. This grows tiresome over time. In contrast, if the arm is working within the minZ region, the user is more comfortable and the user interaction becomes comfortable and more accurate.

While the present description is in the context of determining a fingertip for a pointing gesture, other types of pointing may be detected and other types of gestures. As an example, the user may be holding a wand, baton, sword, or other device for pointing. In this case, the end of the wand or baton would be detected. The user may also be making a different type of indicating gesture in which case, more digits may be detected to interpret a direction in which the user is indicating. The user may also indicate with a digit other than the index finger as shown here. As an example, the user may indicate with the middle finger or the thumb. Different digits may be interpreted as indicating different commands. The tip of this pointing device, whether a digit or handheld wand or baton will be referred to generally as a fingertip, but may be any pointing tip or the tip of anything that is used for pointing.

Figure 3:
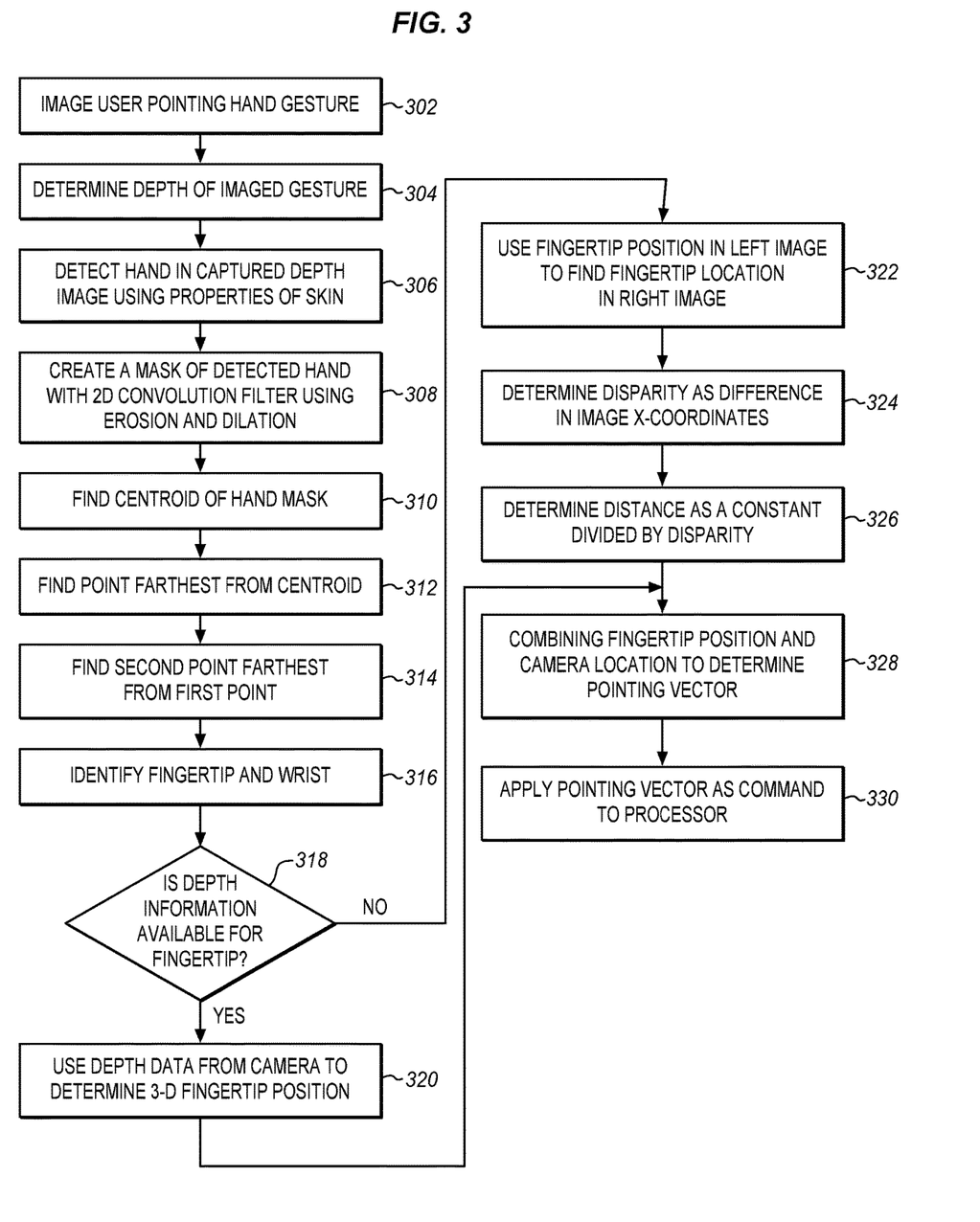
FIG. 3 is another process flow diagram for determining a pointing vector for a gesture according to an embodiment.

FIG. 3 is a process flow diagram showing a more detailed process for determining a pointing vector using a stereo IR camera. The operations described herein may be modified to suit other and different types of depth cameras and other depth sensors. After system initialization and calibration, the process starts with the user making a pointing hand gesture. This gesture is imaged by the depth camera system at 302. The camera system then determines a depth for the image, if possible, at 304.

In this context, the camera system may correspond to any of a variety of different depth cameras combined with processing resources. In some cases, the camera system may be two or more cameras or image sensors coupled to an image signal processor with or without an additional general or graphics processing unit. In other cases, there may be one or more image sensors combined with proximity sensors, rangefinders or other depth sensors coupled together through an image signal processor, general processor or other resources. The camera system may be coupled to a larger system for performing other functions, such as presenting information and images on a display, communicating with other devices, and acting on commands received from the user.

At 306 the hand in the captured depth image is detected. This may be done in a variety of different ways. Hands have unique characteristics including shape and texture. A hand mask may be isolated by applying a 2D convolution filter with a small filter representing a sliding window of the entire image. The filter may be applied first to the left image or the right image or to a single image of a rangefinder system. While the left image is discussed as being filtered first, images may be filtered in any order. In some embodiments, the 2D filter of the left image fills in the holes in the depth map of the original depth image. The 2D filter applied to the left image produces a mask which isolates skin in the image. The 2D convolution filter approach has a benefit of working also with oversaturated images that are captured when the hand is very close to the illuminator of the camera system.

In some embodiments, the translucent property of skin is used in combination with the 3D camera's IR emitted pattern to separate skin from other non-biological material. With an emitted IR pattern, the IR light will be reflected from translucent and diffusive skin differently than from other materials, especially non-biological materials. The reflected IR pattern is imaged by the camera system and non-biological material may be eliminated from the image.

At 308 a mask of the hand is created. In some embodiments, the mask may be the result of a 2D convolution filter applied over the biological material of the image using a small, e.g. 3 by 3 kernel, for the convolution. Using the convolution filter, erosion is applied and then dilation is applied to isolate the skin from the background and the wrist and to obtain a pixelated hand mask.

Figure 4:
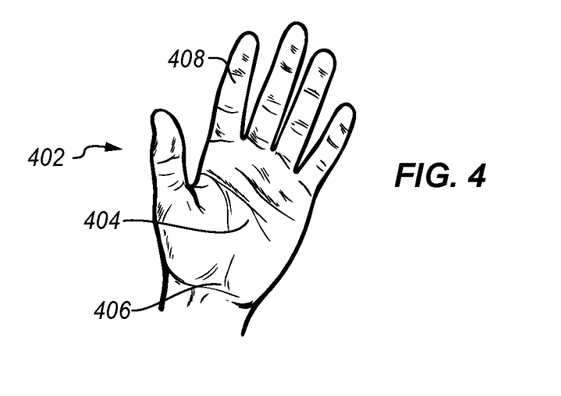
FIG. 4 is a diagram of a hand captured by an image sensor according to an embodiment.

FIG. 4 is a diagram of how a hand 402 may be captured by an image sensor. The hand shows a palm 404 with a heel 406 and a number of fingers including an index finger 408 that is normally used for pointing. The line drawing approximates a hand outline. The centroid for this hand will be somewhere in the center of the palm.

Figure 5:
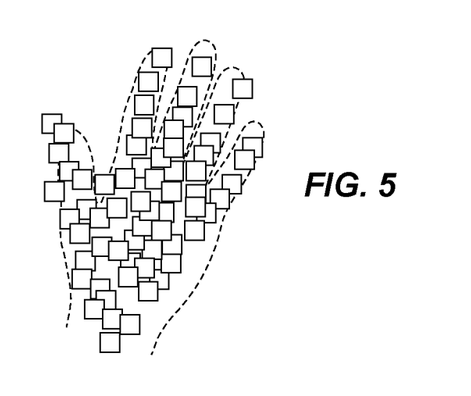
FIG. 5 is a diagram of a hand after filtering according to an embodiment.

FIG. 5 is a diagram of how a hand may look after the filtering is applied. The skin is still isolated from the background and from the wrist. The result is pixelated due to the erosion followed by dilation. The mask at this point is represented more by a brightness map corresponding to characteristic features of a hand. The outline of the hand is shown in dotted line for reference but does not appear in the filtered image.

Returning to FIG. 3 at 310 the centroid of the hand mask is found. At 312 a first point on the hand mask that is farthest from the centroid is found. At 314 a second point is found that is the second farthest from the first point. One of these points is the fingertip and the other is the heel of the wrist. At 316 the fingertip and the wrist are distinguished from each other and assigned each to one of these two points. The fingertip may be identified, for example, as the point farthest from the edge of the image.

In the above, the fingertip has been identified regardless of whether the hand has been held in the normal operating range of the depth camera or not. If the region surrounding the fingertip has depth, that depth is used at 320 to determine the distance to the fingertip. If the region surrounding the fingertip has no depth, then the left and right images are used to find that distance. Accordingly, at 318 it is determined whether depth information is available from the depth camera. This may be done by examining the image or image metadata or by comparing the distance of the hand to the minimum Z distance (minZ) of the camera in some other way.

If the depth information is available, then at 320 the depth data is used to determine the fingertip position in three dimensions including distance from the camera. If the depth information is not available, then the distance is determined in another way, such as by using disparity of modified versions of the images in both image sensors.

At 322 the fingertip position in the left image that was identified with the hand mask is used to find the fingertip position in the right image. The technique to do this will vary with the particular image sensor and depth configuration. For a horizontally aligned stereo camera the y-coordinates or vertical positions of the fingertip in the two images are identical. The x-coordinate in the right image may be found using the saturated image pixels in the right image. The pixels are saturated because the fingertip is too close to the illuminator. These saturated pixels may be used as a mask that corresponds to the one identified in the left image after the 2D convolution filter was applied.

Figure 6:
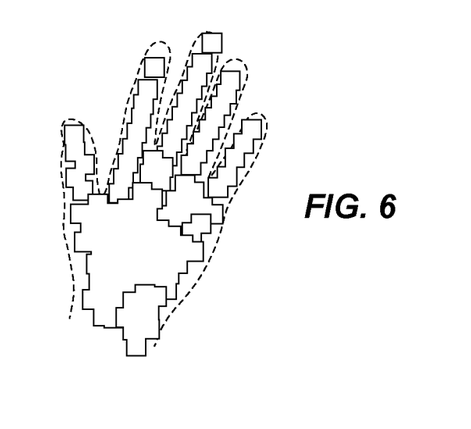
FIG. 6 is a diagram of a hand that is too close to the image sensor after filtering according to an embodiment.

FIG. 6 is a diagram of how the hand of FIG. 4 may look in the right image when the image is saturated because hand is too close to the illuminator. The 2D convolution filter has been used to fill in some holes in the image and to simplify the structure so that the hand appears pixilated. The dotted line outline of the hand does not appear in the filtered image. Such an image may be used to find the position of a fingertip in x-coordinates. The search for the fingertip is made easier by starting at the x-coordinate corresponding to the fingertip position in the left image. The search then proceeds horizontally in one direction until the fingertip is found. The search distance is limited by minZ. The fingertip is closer than minZ to the camera. Some number of x-coordinates correspond to the minZ distance. Accordingly, the fingertip must be no farther than that number of x-coordinates.

At 324, after the corresponding x-coordinates are found, the disparity may be determined as the difference in the x-coordinates. At 326, the distance from the camera may be determined using the disparity. With some depth cameras, the distance is a constant divided by the disparity. The constant depends on the distance between the left and right image sensors.

Given the distance and the horizontal and vertical position of the fingertip, the pointing vector may be determined. For a head mounted display, the pointing vector is a vector from the position of the camera to the fingertip. Since the position of the camera is known, only a single new point, the fingertip, is used when determining the pointing vector.

For other systems, the position of the user's head may first be determined and then the pointing vector may be determined as the vector from the user's head to the fingertip. When used with a tablet or notebook computer, for example, the user's head may be within the range of the depth camera while the user's hands are in front of the user much closer to the camera and closer than minZ. For other systems another location may be used for the base of the vector. Using different locations for the base of the vector allows the systems and techniques described herein to be used with different computing and interface configurations.

Figure 7:
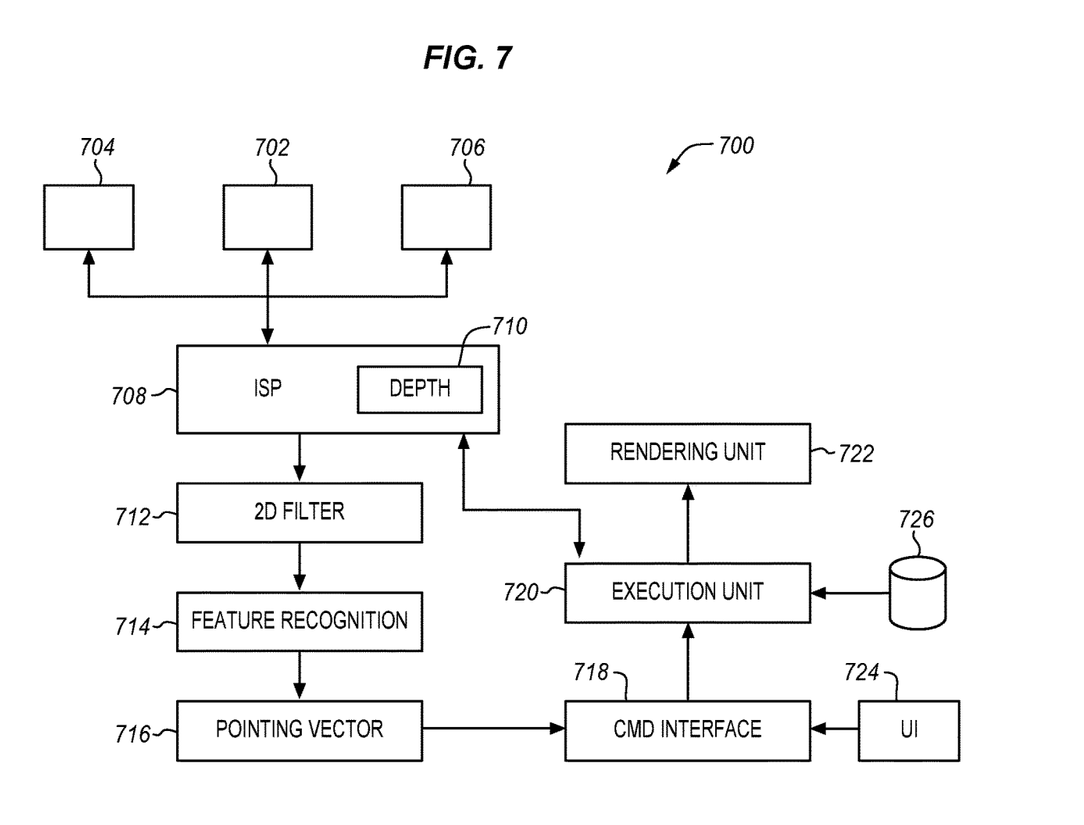
FIG. 7 is a block diagram of a head mounted display according to an embodiment.

FIG. 7 is a block diagram of a head mounted display 700 for virtual or augmented reality according to the above description. The configuration of the head mounted display may be adapted to suit different types of devices and systems. The system has an illuminator 702 such as and IR LED to illuminate hands and other objects in front of the display. Two cameras 704, 706 or image sensors are placed near the illuminator to detect IR light from the LED reflected off objects in front of the display 700. The LED is controlled by an image signal processor (ISP) 708 which also receives images from the two cameras 704, 706. The ISP processes the images and determines depth in a module 710 to form a composite image from each camera in the form of images with a depth map.

The images are received from the ISP at a 2D filter 712 to perform erosion, dilation and any other filtering that is useful to the system. The filtered images are sent to a feature recognition module 714 to find hands, fingertips, centroids and other features of images. While hands are discussed herein, the feature recognition module may be used to find many other features to support other functions of augmented or virtual reality. The feature recognition module is coupled to an arithmetic unit to serve as a pointing vector module 716. The pointing vector is determined based on the recognized fingertip and the vector is then sent to a command interface 718. The command interface uses the pointing vector together with other information to determine a command intended by the pointing gesture. The command interface is also coupled to a user interface 724 to receive commands from other interface devices such as touch surfaces, buttons, controllers, etc.

Figure 8:
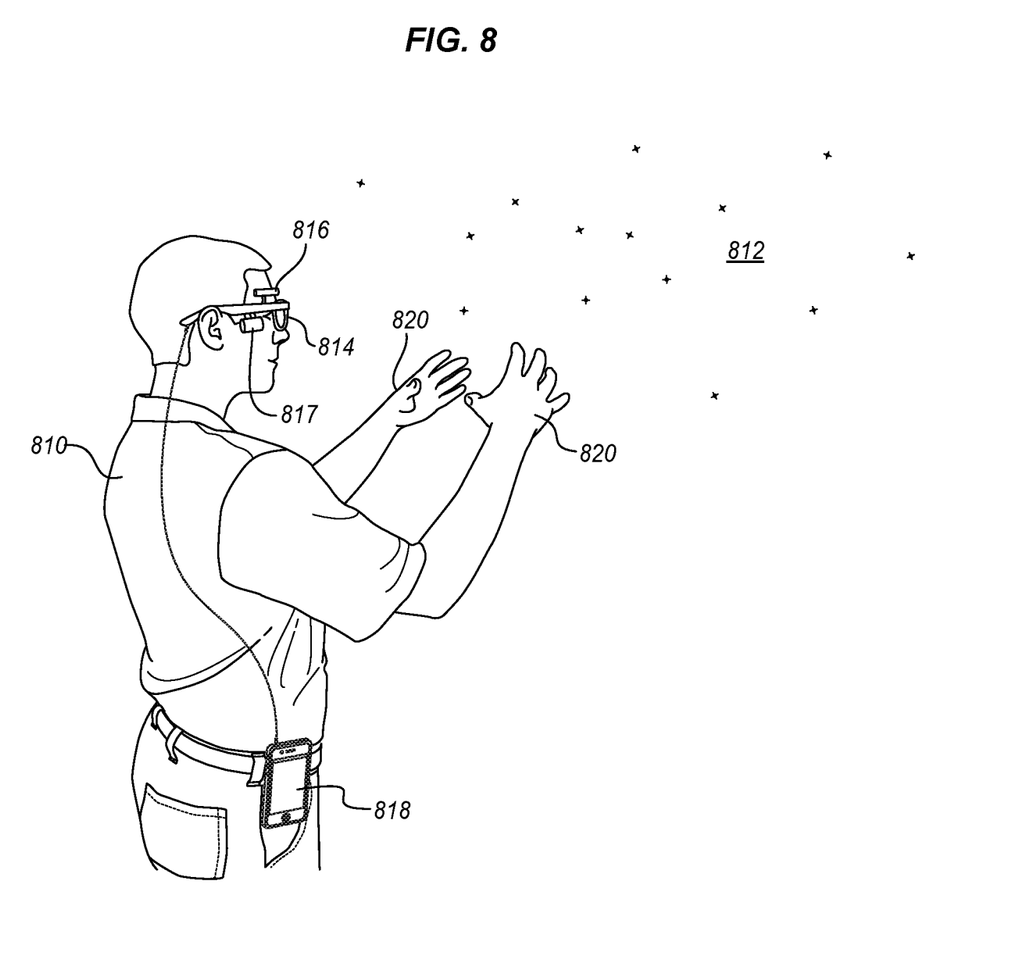
FIG. 8 is a diagram of a head mounted display in use and coupled to a portable computing device according to an embodiment.

The command is sent from the command interface to an execution unit 720 such as a central processing unit or controller to execute the command from the command interface. The execution unit is coupled to a mass storage device 726 to retrieve instructions and operands that are invoked by the command and to a rendering unit to render responses to the command. The rendering unit may render augmented information or virtual images or command interface text or images. The execution unit is also coupled to the ISP 708 to receive metadata and to control the operation of the camera and illuminator. The FIG. 8 shows an example of system as described herein use. A user 810 is standing in view of the night sky 812, where stars, planets, comets, and perhaps a few airplanes can be seen. For augmented reality purposes, the viewer is looking through the transparent lenses of a pair of eyeglasses or goggles 814 which are equipped with a stereo camera system 816 and a projector 817. The eyeglasses may also be equipped with other devices such as positioning and inertial reference systems, among others (not shown). The camera looks out in the direction that the viewer is looking to see the viewer's view of the sky. The projector is able to project an augmented reality image in front of the viewer either onto the lenses or out past the lenses. While the term projector is used, in the case of an electrochromic or transparent OLED display, images will not be projected as much as displayed, however, the same principles apply to such a display system as to a projector. Alternatively, the system may be a virtual reality set of eyeglasses or goggles in which the stars, planets, etc. are projected onto an opaque screen together with any virtual reality objects. In this case, the viewer looks directly at the screen and is not able to see the surrounding real sky.

The camera system and projector or display are coupled to a computing system 18, shown as a smartphone or small tablet in the present illustration, however, the computing system may be larger or smaller and take a variety of different form factors. The computing system may be physically attached or integrated into the eyeglasses, worn as a separate device, as shown, or be a fixed or separate hand carried device. The computing system may be coupled to the camera and projector through one or more cables as shown or wirelessly using any of a variety of different wireless communications systems. The computing system as illustrated includes buttons and a display which may be a touch surface for additional user input. The particular user interface may be adapted to suit the device and its applications.

Examples of a computing system 818 may include, without limitation, a mobile device, a personal digital assistant, a mobile computing device, a smart phone, a cellular telephone, a handset, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, or combination thereof.

The user is also shown as holding his hands 820 in view of the camera system 816. Using the cameras, the user can gesture with his hands to send commands to the computing system. The commands may call up a particular type of information on the display. Zoom in or out on the display, scan across the display in different directions, or select particular objects in the night sky. The gestures are observed by the camera and provided to the computing system which executes commands as a result, an audio or visual confirmation may be provided using speakers (not shown) in the eyeglasses or the computing system or using the projector.

Figure 9:
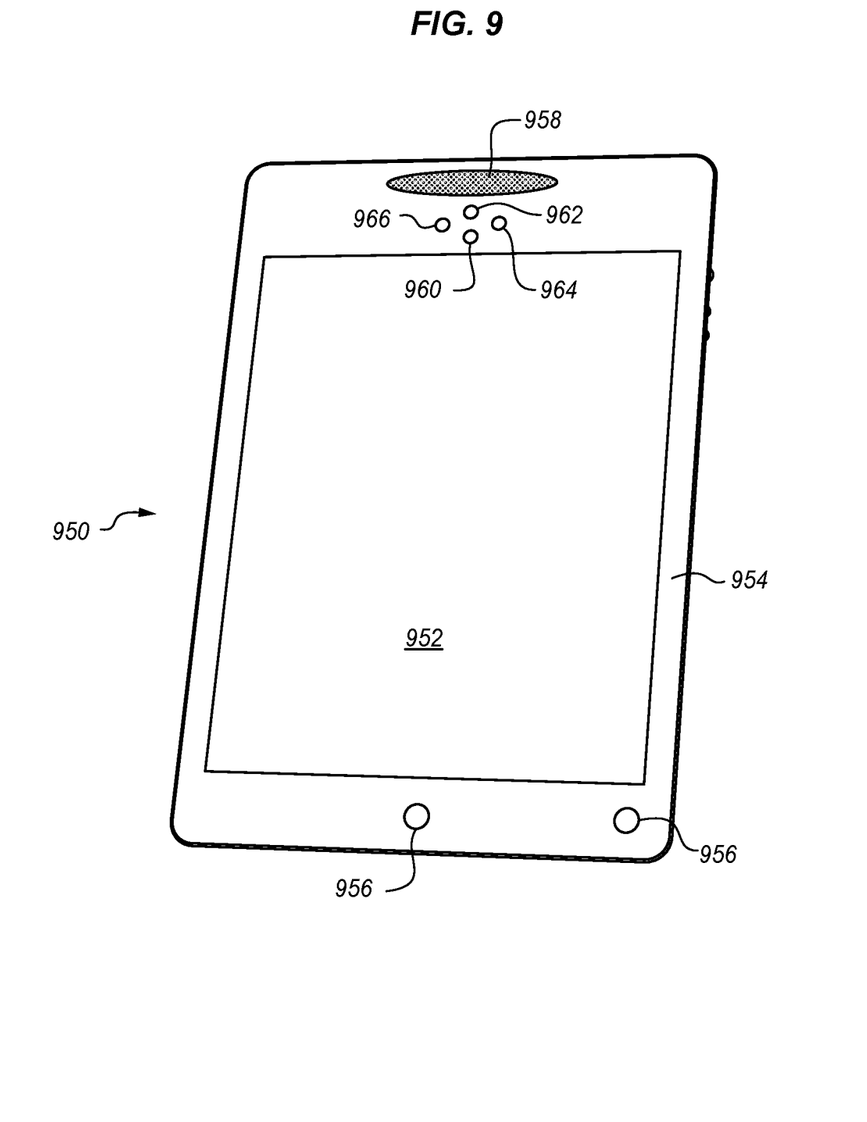
FIG. 9 is a diagram of a display-based computing device incorporating a depth camera according to an embodiment.

FIG. 9 is an isometric diagram of a portable device suitable for use with the depth camera hand gesture system as described herein. This device is a notebook, convertible, or tablet computer or smartphone 920 with or without an attached keyboard. A television, wall display, or video conference node may also be represented by the drawing.

The tablet or monitor 950 includes a display 952 and a bezel 954. The bezel may be used to house at least some of the various audiovisual components of the device. In this example, the bottom part of the bezel below the display houses two microphones 956 and the top of the bezel above the display houses a speaker 958. In this example the microphones are separated apart to provide a spatial character to the received audio. More or fewer microphones may be used depending on the desired cost and audio performance. Similarly multiple speakers may be used to provide depth. This is a suitable configuration for a smart phone and may also be adapted for use with other types of devices.

The bezel also houses two cameras 964, 966 place side by side for depth detection. The cameras may be used to capture depth enhanced video images of hands for authentication and gestures. The cameras may be nearer or farther apart depending on the intended use and size of the overall system 950. One or more LEDs 960, 962 are provided for illumination. A white LED 960 may be used to illuminate the local user for the benefit of a remote viewer. The white LED may also be used as a flash for still imagery. The second LED 962 may be used for IR imaging as discussed above.

The various processors and other components discussed above, such as the ISP, graphics processor, CPU and other components may be housed behind the display and bezel or in another connected component. The particular placement and number of the components shown may be adapted to suit different usage models. More and fewer microphones, speakers, and LEDs may be used to suit different implementations. Additional components, such as proximity sensors, rangefinders, additional cameras, and other components may also be added to the bezel or to other locations, depending on the particular implementation.

This computer may be used as a conferencing or gaming device in which remote audio is played back through the speakers and remote video is presented on the display. The computer receives local audio at the microphones and local video at the two composite cameras. The communications or gaming nodes of FIGS. 8 and 9 are provided as examples but different form factors such as a desktop workstation, a wall display, a conference room telephone, an all-in-one or convertible computer, and a set-top box form factor may be used, among others. The image sensors may be located in a separate housing from the display and may be disconnected from the display bezel, depending on the particular implementation. In some implementations, the display may not have a bezel. For such a display, the microphones, cameras, speakers, LEDs and other components may be mounted in another housing that may or may not be attached to the display.

Figure 10:
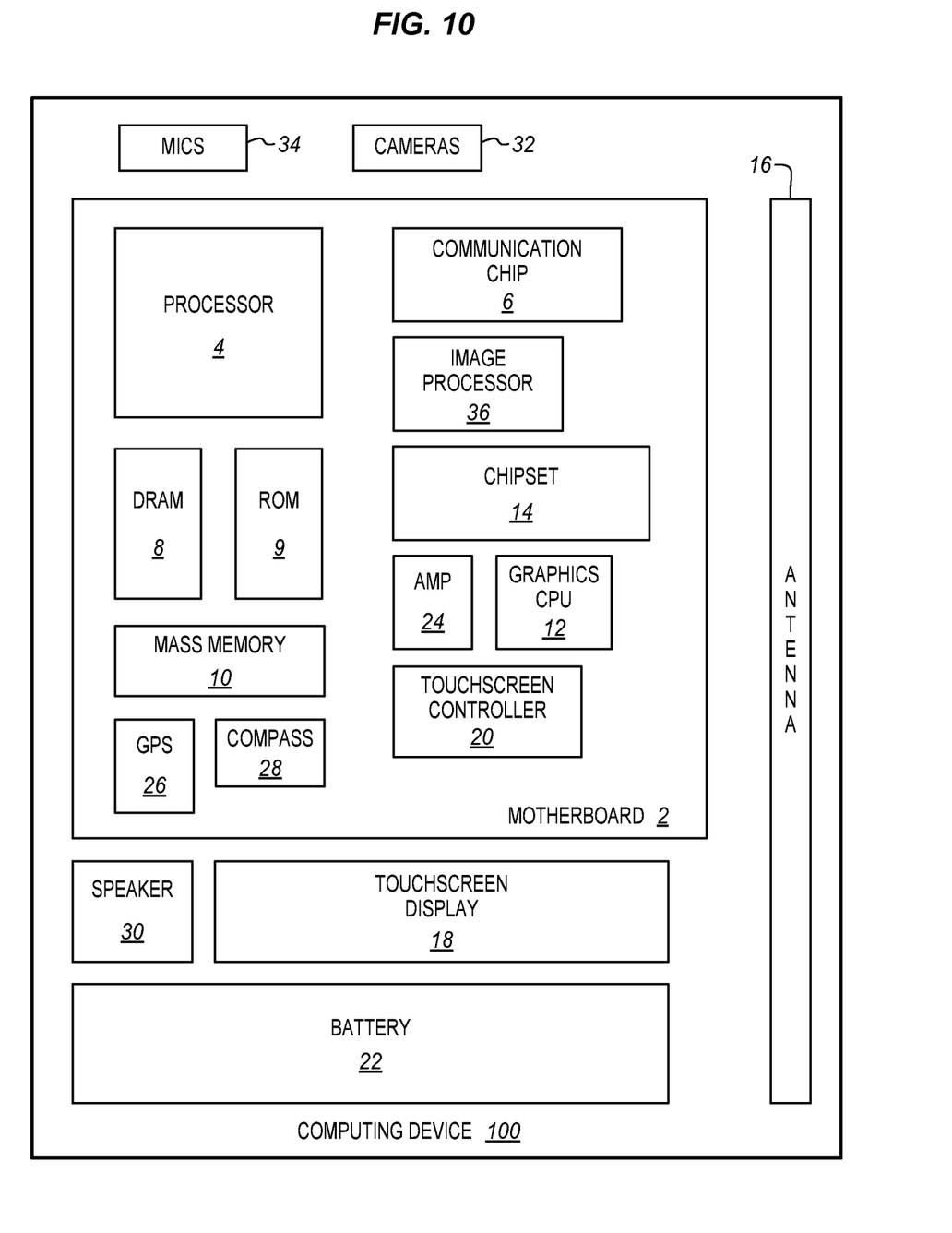
FIG. 10 is a block diagram of a computing device incorporating a depth camera according to an embodiment.

FIG. 10 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 to perform conversions, analysis, noise reduction, comparisons, depth or distance analysis, image understanding and other processes as described herein. The processor 4 is coupled to the image processor to drive the process with interrupts, set parameters, and control operations of image processor and the cameras. Image processing may instead be performed in the processor 4, the graphics CPU 12, the cameras 32, or in any other device.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a first and a second image of a pointing gesture in a depth camera, the depth camera having a first and a second image sensor, applying erosion and dilation to the first image using a 2D convolution filter to isolate the gesture from other objects, finding the imaged gesture in the filtered first image of the camera, finding a pointing tip of the imaged gesture, determining a position of the pointing tip of the imaged gesture using the second image, and determining a pointing vector using the determined position of the pointing tip.

In further embodiments finding the imaged gesture comprises finding a hand.

In further embodiments applying the filter comprises applying the filter to the second image of the depth camera.

In further embodiments finding a pointing tip comprises finding a centroid of the imaged gesture and finding a point of the imaged gesture that is farthest from the centroid.

In further embodiments the imaged gesture includes a hand and finding a pointing tip further includes finding a second point farthest from the first point, selecting a point of the first point and second point which is farthest from an edge of the image, and selecting the point farthest from the edge as the pointing tip of a finger.

Further embodiments include determining whether the imaged gesture is closer than a minimum distance from the depth camera.

In further embodiments if the imaged gesture is closer than the minimum distance then determining the position of the pointing tip using disparity between the first and the second images.

In further embodiments if the imaged gesture is not closer than the minimum distance then determining the position of the pointing tip using depth information from the depth camera to determine a location of the gesture.

Further embodiments include interpreting the pointing gesture as a command and providing a command including the pointing vector to an execution unit.

Some embodiments pertain to a hand gesture recognition system that includes a depth camera having a first and a second image sensor to receive a first and a second image of a pointing gesture, an illuminator to illuminate the pointing gesture for the depth camera, an image processor to apply erosion and dilation to the first image using a 2D convolution filter to isolate the gesture from other objects, to find the imaged gesture in the filtered first image of the camera, to find a pointing tip of the imaged gesture, to determine a position of the pointing tip of the imaged gesture using the second image, and to determine a pointing vector using the determined position of the pointing tip, and a command interface to interpret the pointing vector as a command to an execution unit.

In further embodiments the execution unit is a central processing unit that is separate from the image processor.

Further embodiments include a head mounted display and wherein the depth camera and the image processor are attached to the head mounted display.

In further embodiments applying the filter comprises applying the filter to the second image of the depth camera.

In further embodiments the image processor is further to determine whether the imaged gesture is closer than a minimum distance from the depth camera and if the imaged gesture is closer than the minimum distance then to determine the position of the pointing tip using disparity between the first and the second filtered images.

In further embodiments if the imaged gesture is not closer than the minimum distance then to determine the position of the pointing tip using depth information from the depth camera to determine a location of the gesture.

Some embodiments pertain to a computer-readable medium having instructions that when executed by the machine cause the machine to perform operations that includes receiving a first and a second image of a pointing gesture in a depth camera, the depth camera having a first and a second image sensor, applying erosion and dilation to the first image using a 2D convolution filter to isolate the gesture from other objects, finding the imaged gesture in the filtered first image of the camera, finding a pointing tip of the imaged gesture, determining a position of the pointing tip of the imaged gesture using the second image, and determining a pointing vector using the determined position of the pointing tip.

In further embodiments finding the imaged gesture comprises finding a hand.

In further embodiments applying the filter comprises applying the filter to the second image of the depth camera.

In further embodiments finding a pointing tip comprises finding a centroid of the imaged gesture and finding a point of the imaged gesture that is farthest from the centroid.

In further embodiments the imaged gesture includes a hand and finding a pointing tip further includes finding a second point farthest from the first point, selecting a point of the first point and second point which is farthest from an edge of the image, and selecting the point farthest from the edge as the pointing tip of a finger.

Some embodiments pertain to an apparatus that includes means for receiving a first and a second image of a pointing gesture in a depth camera, the depth camera having a first and a second image sensor, means for applying erosion and dilation to the first image using a 2D convolution filter to isolate the gesture from other objects, means for finding the imaged gesture in the filtered first image of the camera, means for finding a pointing tip of the imaged gesture, means for determining a position of the pointing tip of the imaged gesture using the second image, and means for determining a pointing vector using the determined position of the pointing tip.

In further embodiments the means for finding the imaged gesture finds a hand.

In further embodiments the means for applying the filter applies the filter to the second image of the depth camera.

In further embodiments the means for finding a pointing tip finds a centroid of the imaged gesture and finds a point of the imaged gesture that is farthest from the centroid.

In further embodiments the imaged gesture includes a hand and wherein the means for finding a pointing tip further performs finding a second point farthest from the first point, selecting a point of the first point and second point which is farthest from an edge of the image, and selecting the point farthest from the edge as the pointing tip of a finger.

The invention claimed is:

1. A method comprising:
    receiving a first and a second image of a pointing gesture in a depth camera, the depth camera having a first and a second image sensor;
    detecting a hand in the first and second images using properties of skin;
    creating a mask of the detected hand by applying erosion and dilation to the first image using a 2D convolution filter to isolate the gesture from other objects;
    finding the imaged gesture in the filtered first image of the camera;
    finding a pointing tip of the imaged gesture;
    determining a position of the pointing tip of the imaged gesture using the second image, wherein determining a position of the pointing tip comprises
    determining that the imaged gesture is closer than a minimum distance, and determining the position of the pointing tip using disparity between the first and the second images by creating a mask of the detected hand by applying erosion and dilation to the second image using the 2D convolution filter;
    determining a pointing vector using the determined position of the pointing tip, interpreting the pointing vector as a command; and
    providing the command to an execution unit of a computing device with a display for execution to control user interaction with the virtual space displayed on the display.

2. The method of claim 1, wherein finding the imaged gesture comprises finding a hand.

3. The method of claim 1, wherein applying the filter comprises applying the filter to the second image of the depth camera.

4. The method of claim 1, wherein finding a pointing tip comprises finding a centroid of the imaged gesture and finding a point of the imaged gesture that is farthest from the centroid.

5. The method of claim 4, wherein the imaged gesture includes a hand and wherein finding a pointing tip further comprises:
    finding a second point farthest from a point;
    selecting a point of the first point and second point which is farthest from an edge of the filtered first image; and
    selecting the point farthest from the edge as the pointing tip of a finger.

6. The method of claim 1, further comprising providing the command with the pointing vector to the execution unit.

7. A hand gesture recognition system comprising:
    a depth camera having a first and a second image sensor to receive a first image and a second image of a pointing gesture;
    an illuminator to illuminate the pointing gesture for the depth camera;
    an image processor to detect a hand in the first and second images using properties of skin, to create a mask of the detected hand by applying erosion and dilation to the first image using a 2D convolution filter to isolate the gesture from other objects, to find the imaged gesture in the filtered first image of the camera, to find a pointing tip of the imaged gesture, to determine a position of the pointing tip of the imaged gesture using the second image, and to determine a pointing vector using the determined position of the pointing tip, wherein the image processor is operable to determine a position of the pointing tip by determining whether the imaged gesture is closer than a minimum distance from the depth camera, and if the imaged gesture is closer than the minimum distance then determining the position of the pointing tip using disparity between the first and the second images by creating a mask of the detected hand by applying erosion and dilation to the second image using the 2D convolution filter, and if the imaged gesture is not closer than the minimum distance then determining the position of the pointing tip using depth information from the depth camera to determine a location of the gesture; and a command interface to interpret the pointing vector as a command to an execution unit.

8. The system of claim 7, wherein the execution unit is a central processing unit that is separate from the image processor.

9. The system of claim 7, further comprising a head mounted display and wherein the depth camera and the image processor are attached to the head mounted display.

10. The system of claim 7, wherein applying the filter comprises applying the filter to the second image of the depth camera.

11. A non-transitory computer-readable medium having instructions that when executed by the machine cause the machine to perform operations comprising:
 receiving a first and a second image of a pointing gesture in a depth camera, the depth camera having a first and a second image sensor;
 detecting a hand in the first and second images using properties of skin;
 creating a mask of the detected hand by applying erosion and dilation to the first image using a 2D convolution filter to isolate the gesture from other objects;
 finding the imaged gesture in the filtered first image of the camera;
 finding a pointing tip of the imaged gesture;
 determining a position of the pointing tip of the imaged gesture using the second image, wherein determining the position of the pointing tip comprises
 determining that the imaged gesture is closer than a minimum distance, and determining the position of the pointing tip using disparity between the first and the second images by creating a mask of the detected hand by applying erosion and dilation to the second image using the 2D convolution filter; and
 determining a pointing vector using the determined position of the pointing tip, interpreting the pointing vector as a command; and
 providing the command to an execution unit of a computing device with a display for execution to control user interaction with the virtual space displayed on the display.

12. The medium of claim 11, wherein finding the imaged gesture comprises finding a hand.

13. The medium of claim 11, wherein applying the filter comprises applying the filter to the second image of the depth camera.

14. The medium of claim 11, wherein finding a pointing tip comprises finding a centroid of the imaged gesture and finding a point of the imaged gesture that is farthest from the centroid.

15. The medium of claim 14, wherein the imaged gesture includes a hand and wherein finding a pointing tip further comprises:
 finding a second point farthest from the first point;
 selecting a point of the first point and second point which is farthest from an edge of the filtered first image; and
 selecting the point farthest from the edge as the pointing tip of a finger.

* * * * *